(12) United States Patent
Robson et al.

(10) Patent No.: US 7,828,630 B2
(45) Date of Patent: Nov. 9, 2010

(54) TOOL BODY

(75) Inventors: Nigel Robson, Newton Hall (GB); Brian Wadge, Coxhoe (GB)

(73) Assignee: Black & Decker Inc., Newark, DE (US)

( * ) Notice: Subject to any disclaimer, the term of this patent is extended or adjusted under 35 U.S.C. 154(b) by 1969 days.

(21) Appl. No.: 10/635,156

(22) Filed: Aug. 6, 2003

(65) Prior Publication Data
US 2004/0029508 A1 Feb. 12, 2004

Related U.S. Application Data

(63) Continuation of application No. 09/245,663, filed on Feb. 8, 1999, now Pat. No. 6,641,467.

(51) Int. Cl.
*B24B 27/08* (2006.01)
(52) U.S. Cl. ....................... 451/344; 451/363
(58) Field of Classification Search ................. 451/334, 451/363, 415, 344; 30/500, DIG. 1; 408/20, 408/21, 22, 31
See application file for complete search history.

(56) References Cited

U.S. PATENT DOCUMENTS

| 3,427,075 A | 2/1969 | Kress et al. |
| 3,724,237 A | 4/1973 | Wood |
| 3,759,336 A | 9/1973 | Marcovitz et al. |
| 4,103,511 A * | 8/1978 | Kress et al. ................. 464/177 |
| 4,317,282 A | 3/1982 | Pace |
| 4,685,625 A | 8/1987 | Mazza |
| 4,924,578 A | 5/1990 | Chagnon et al. |
| 4,976,173 A | 12/1990 | Yang |
| 5,033,552 A | 7/1991 | Hu |
| 5,511,912 A | 4/1996 | Ellerbrock |
| D420,267 S | 2/2000 | Robson |
| 6,170,579 B1 | 1/2001 | Wadge |
| 6,176,322 B1 | 1/2001 | Wadge |
| 6,206,107 B1 | 3/2001 | Wadge |

FOREIGN PATENT DOCUMENTS

| GB | 914377 | 1/1963 |
| GB | 1143677 | 2/1969 |

* cited by examiner

*Primary Examiner*—Maurina Rachuba
(74) *Attorney, Agent, or Firm*—Harness, Dickey & Pierce, P.L.C.

(57) ABSTRACT

A power tool (2) includes a motor (22) pivotally mounted within the housing of the tool. The tool is able to accept any one of a plurality of attachment members (44, 46, 48).

7 Claims, 5 Drawing Sheets

TOOL BODY

This is a continuation application of U.S. patent application Ser. No. 09/245,663 filed Feb. 8, 1999 and entitled "Tool Body".

The present invention relates to a power tool and has particular although not exclusive, relevance to battery powered tools.

It is conventional for power tools to be designed and built for a dedicated purpose, such as a drill, a jigsaw or a sander. If the user needs to undertake a sanding operation he will use a dedicated sander. If then he needs to drill a hole in a workpiece he will swap the sander for a dedicated drill, and so on.

Whilst such swapping over of dedicated tools is not inconvenient, it does mean that, particularly for the person who needs to use power tools relatively infrequently, considerable expense is incurred in acquiring a broad range of these dedicated power tools.

Furthermore, in the case of so-called "cordless" or battery-powered tools, the user will either need to change the battery pack when changing dedicated tools, or have several ready-charged batteries available for use. These alternative options are cumbersome or expensive respectively.

Solutions to the above problems have been proposed in the past and one such solution entails providing a power tool including a motorised drive which is capable of accepting any one of a plurality of discrete heads which achieve a dedicated purpose. This means that rather than purchasing a dedicated entire power tool for each job, the user only has to purchase a dedicated head (which is cheaper than a dedicated entire tool) and just swap these over as and when necessary.

There still exist certain problems with such solutions, however. In a system such as the discrete heads described above, it is important to ensure a sufficiently secure and rigid attachment between the power tool and the dedicated head. While it is of course necessary to provide a sufficiently secure attachment for all heads, it is particularly important to do so where the nature of the work for which the assembled tool is to be used is likely to generate high forces, in particular relatively high bending and twisting forces between the power tool and the head.

It is an object of the present invention to provide a power tool in which the above disadvantages are reduced or substantially obviated.

The present invention provides a power tool including a body portion defining a handle and a motor mounted within the body portion, which motor is arranged to drive an output spindle of the tool; the body portion further defining an opening around the output spindle, which opening accepts any one of a plurality of attachment heads presented thereto, the power tool characterised in that there is an interface between the body portion of the power tool and the attachment head, and this interface is shaped so that the attachment head is supported in three dimensions.

In a preferred embodiment of a tool according to the invention, the interface between the body portion and the attachment head comprises a first linear section remote from the handle and a second cylindrical section adjacent to the handle.

The linear/cylindrical interface gives added stability as the applied force from the operator's hand acts through the curved intersection. Further, the cupped nature of the intersection provides additional support to any torque reactions when the tool is in operation, for example as either a drill, driver, saw or sander mechanism.

The present invention will now be described, by way of example only and with reference to the accompanying drawings, of which:

Figure 1:
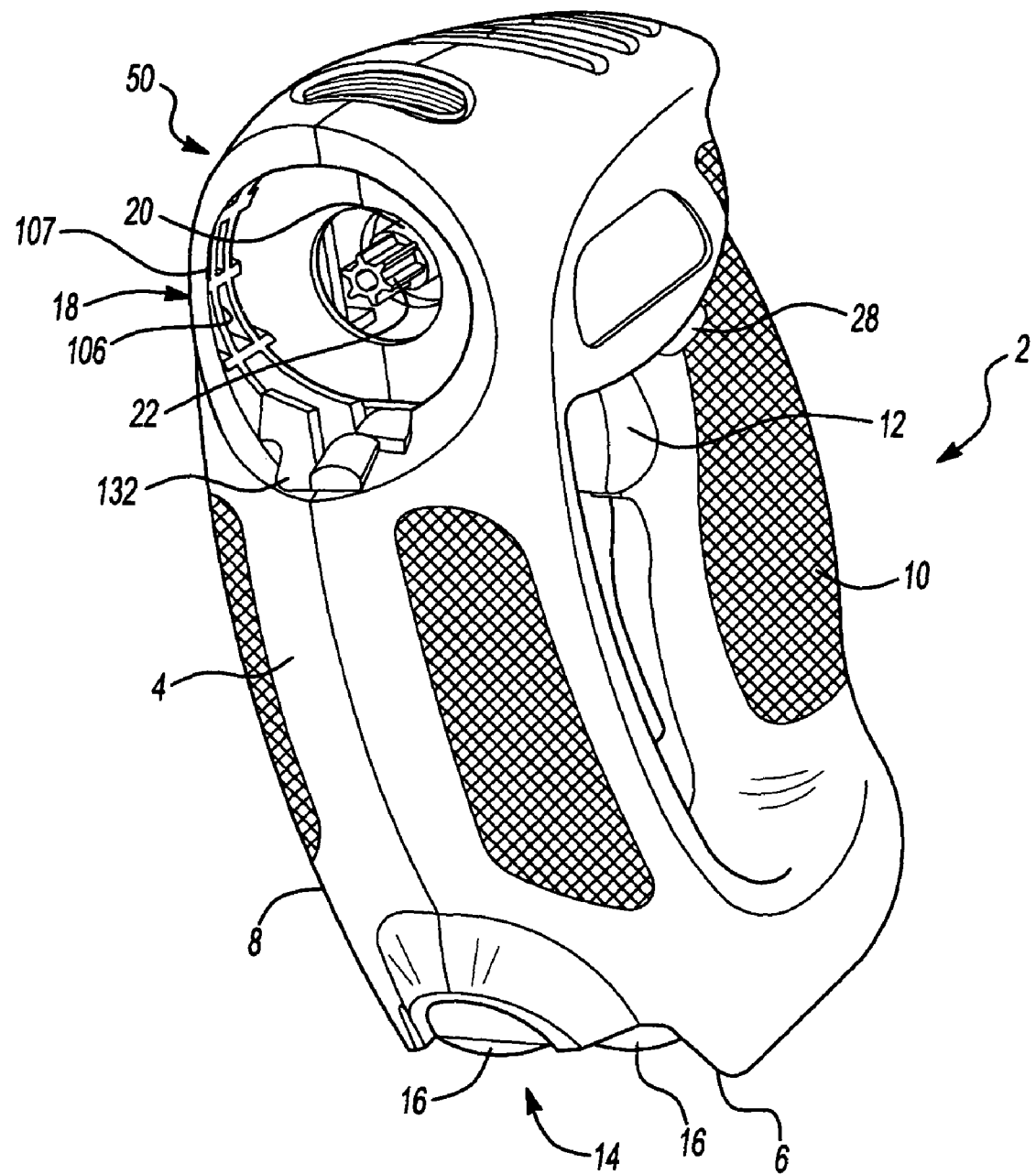
FIG. 1 shows a front perspective view of a body portion of a power tool in accordance with the present invention.
Figure 2:
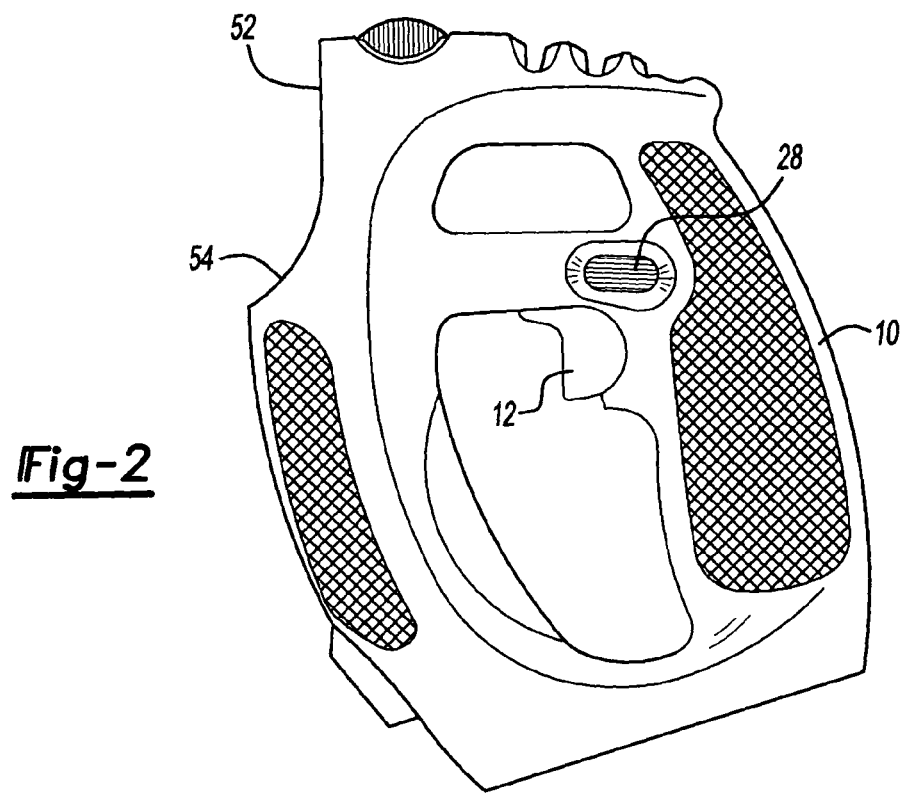
FIG. 2 shows a side view of the body portion of FIG. 1 without an attached head.

Referring first to FIGS. 1 and 2, a power tool shown generally as (2) includes a body portion (4) formed from two halves of a plastics clam shell. The two halves (6, 8) co-operate together to encapsulate the internal mechanisms of the power tool, which will be described here below. The body portion (4) defines a handle (10) which in use of the tool (2) is grasped by the user. The handle (10) is so shaped to provide the user with easy access to an actuating trigger (12) in the form of a pistol grip, which is conventional in the art of power tools. The body portion (4) is formed from the two halves of clamshell (6, 8) also to define an opening shown generally as (14), through which batteries (16) for powering the tool may pass. Those skilled in the art will appreciate that the choice of batteries for powering the tool (2) depends upon the work which the tool is required to undertake. The batteries per se form no part of the present invention and so will not be described in any more detail herein.

At the opposite end of the body portion (4) from the battery opening (14) the two halves of the clamshell (6, 8) define an opening (18) through which an output spindle (20) of a motor (not shown) housed within the body portion (4) is mounted.

A pair of batteries (16) have been passed through the battery opening (14) and are electrically coupled via terminals and a switch operable by the trigger (12) to the motor. The batteries (16) are retained within their opening (14) by a detent mechanism which can be manually operated in order to allow removal of the batteries (16) from the body portion (4).

The motor is selectively coupled to the batteries (16) via the switch in conventional manner. On activation of the trigger (12) the user selectively couples the motor to the battery (16) thereby energising the motor which in turn provides a rotational force upon the output spindle (20).

As is conventional in the art of power tools the motor is provided with a forward/reverse switch (28) the operation of which determines the sense of rotation of the output spindle (20).

Figure 3:
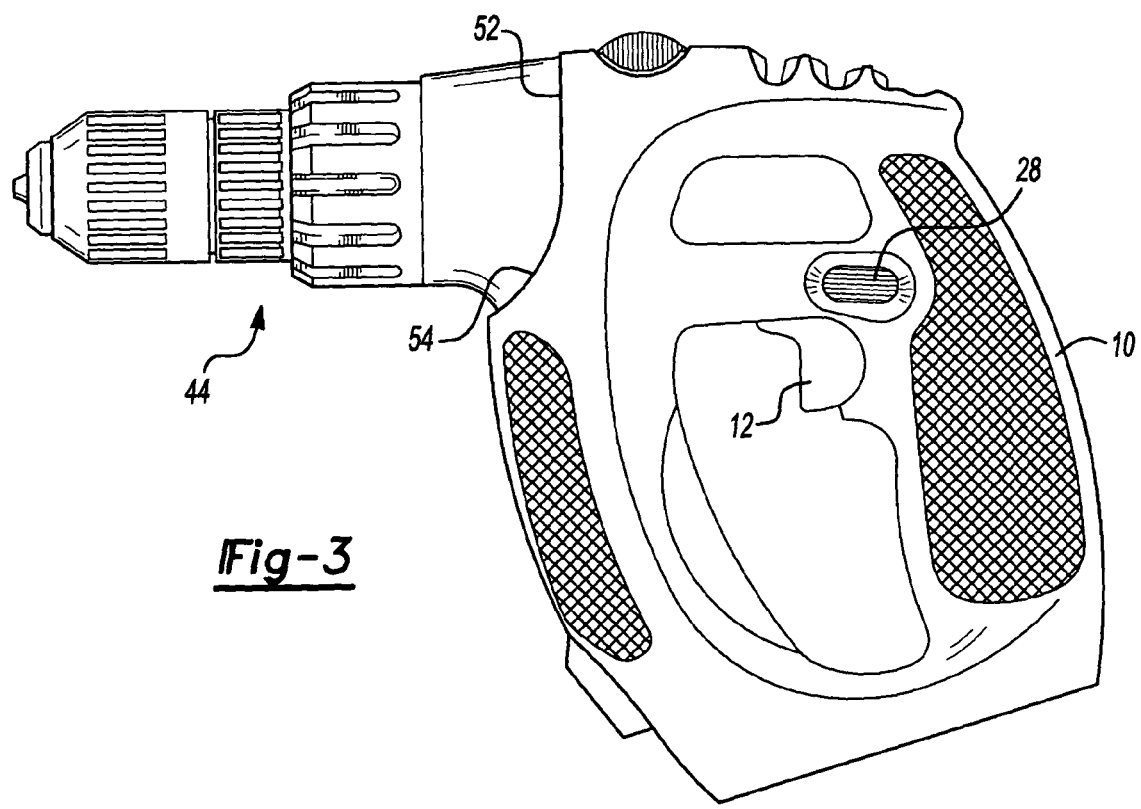
FIG. 3 shows a side view of the body portion of FIG. 1 with an attached head.

As can be seen from FIG. 3, a head (44) is attached to the body portion (4), and engages the output spindle (20) via a splined member (22). The interface surface (50) comprises a first linear section (52) remote from the handle (10) of the tool (2) and a second cylindrical section (54) adjacent to the handle (10).

Figure 4:
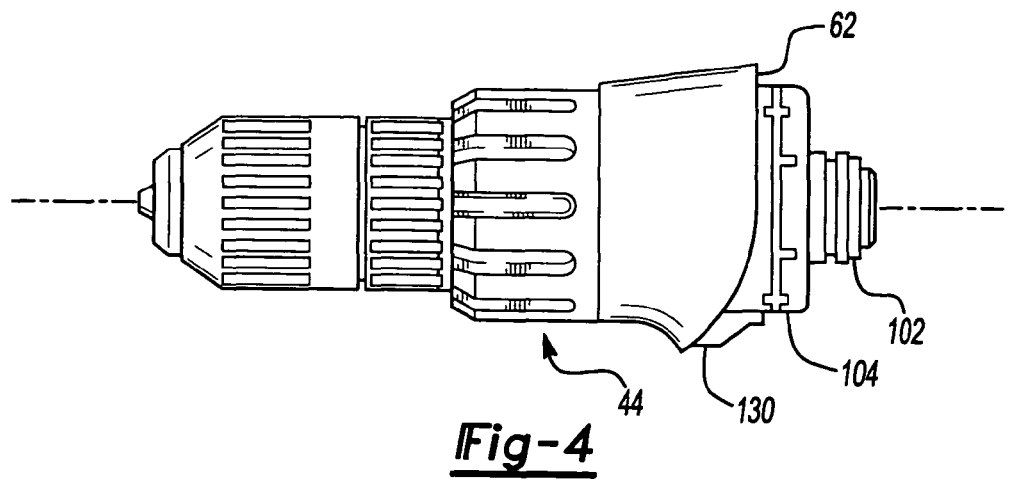
FIG. 4 shows a side view of a drill/driver mechanism for a drill, one of the plurality of heads for attachment to the body portion.

The head (44) as shown in FIG. 3 and FIG. 4 is a drill/driver head for a drill. This can be removed from the body portion (4) and replaced by an alternative head, for example a jigsaw (46) or a sander (48).

Figure 5:
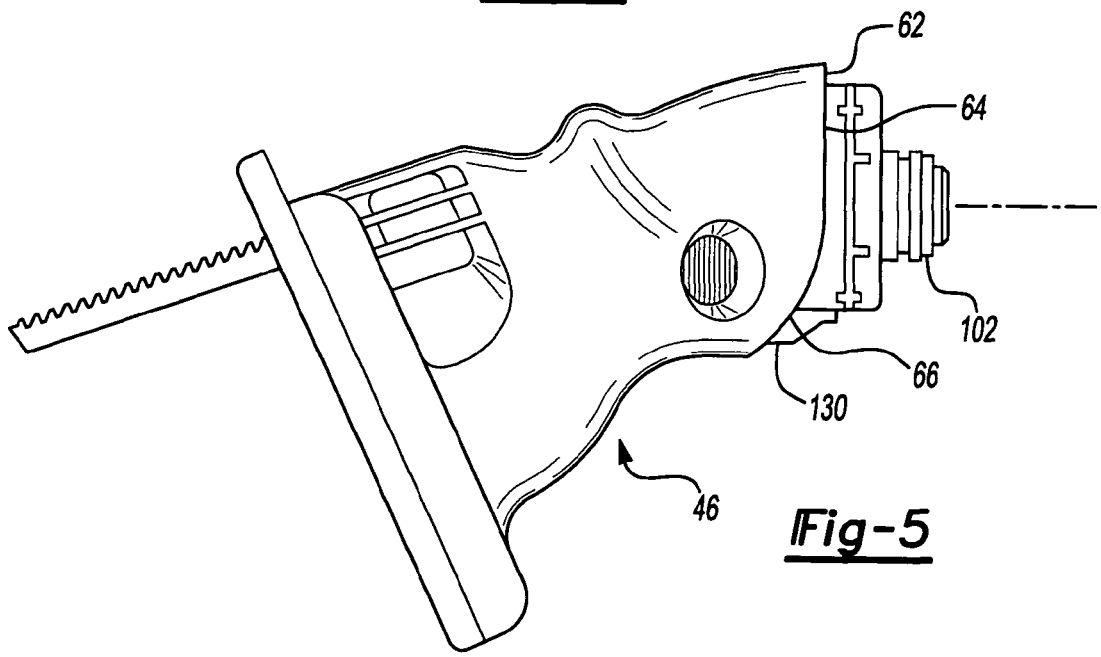
FIG. 5 shows an alternative attachment to FIG. 4, a jigsaw.
Figure 6:
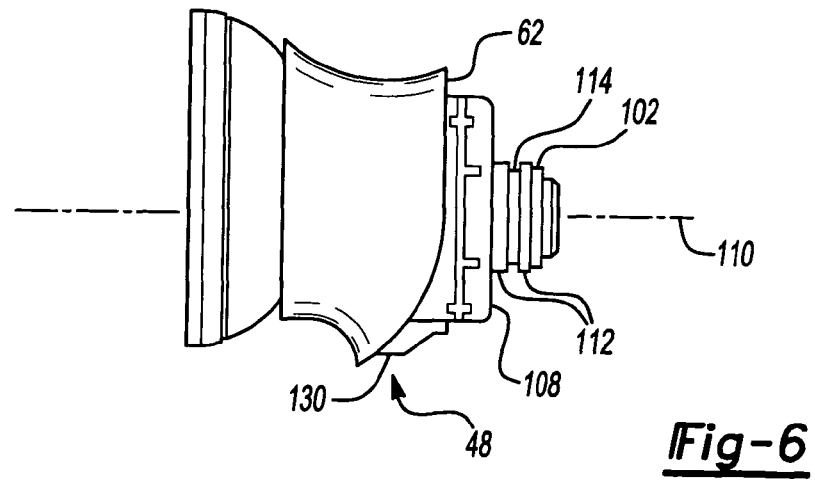
FIG. 6 shows a further attachment, a sander.
Figure 7:
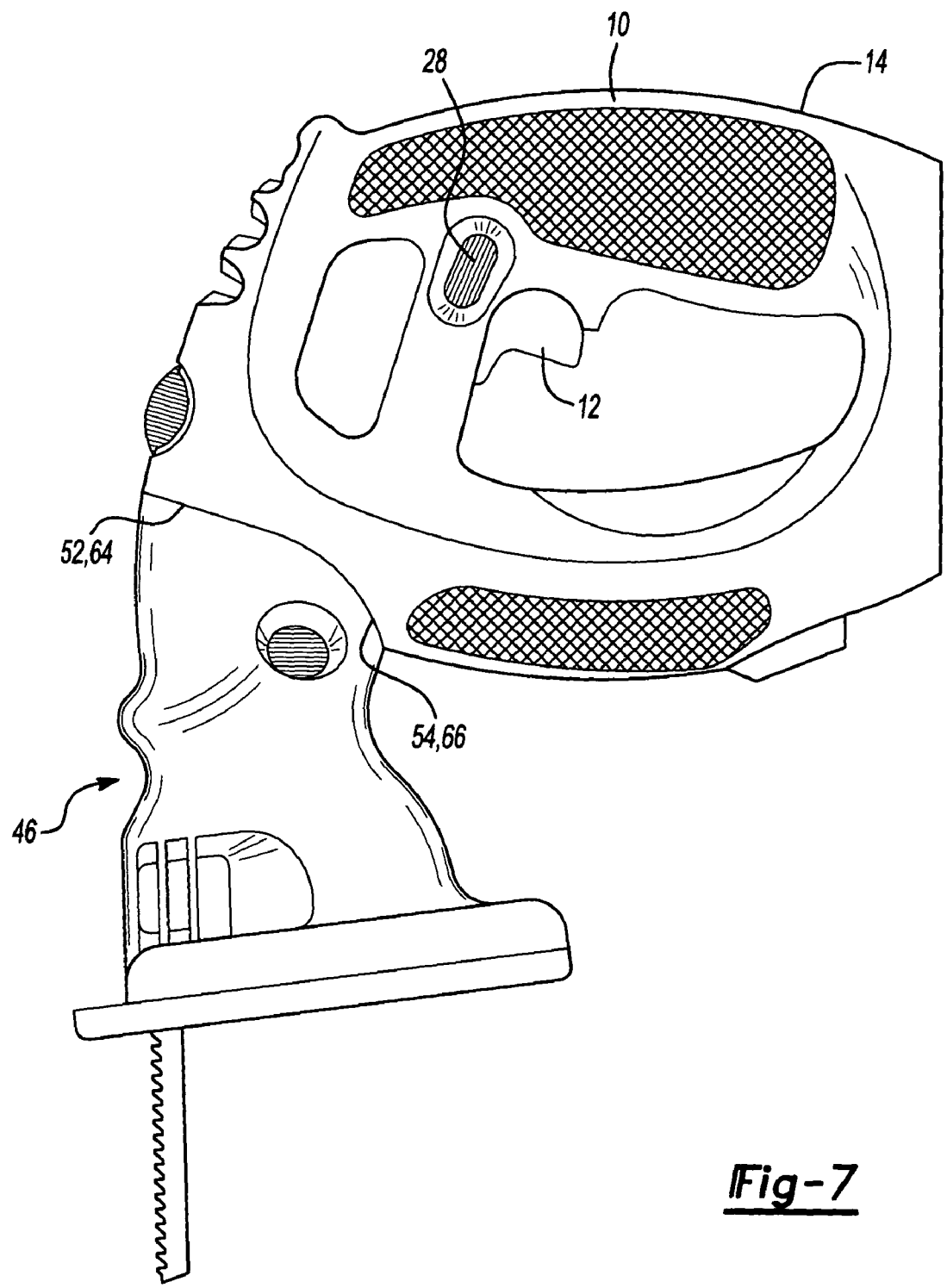
FIG. 7 shows a side view of the body portion of FIG. 1 with an attached jig saw head.
Figure 8:
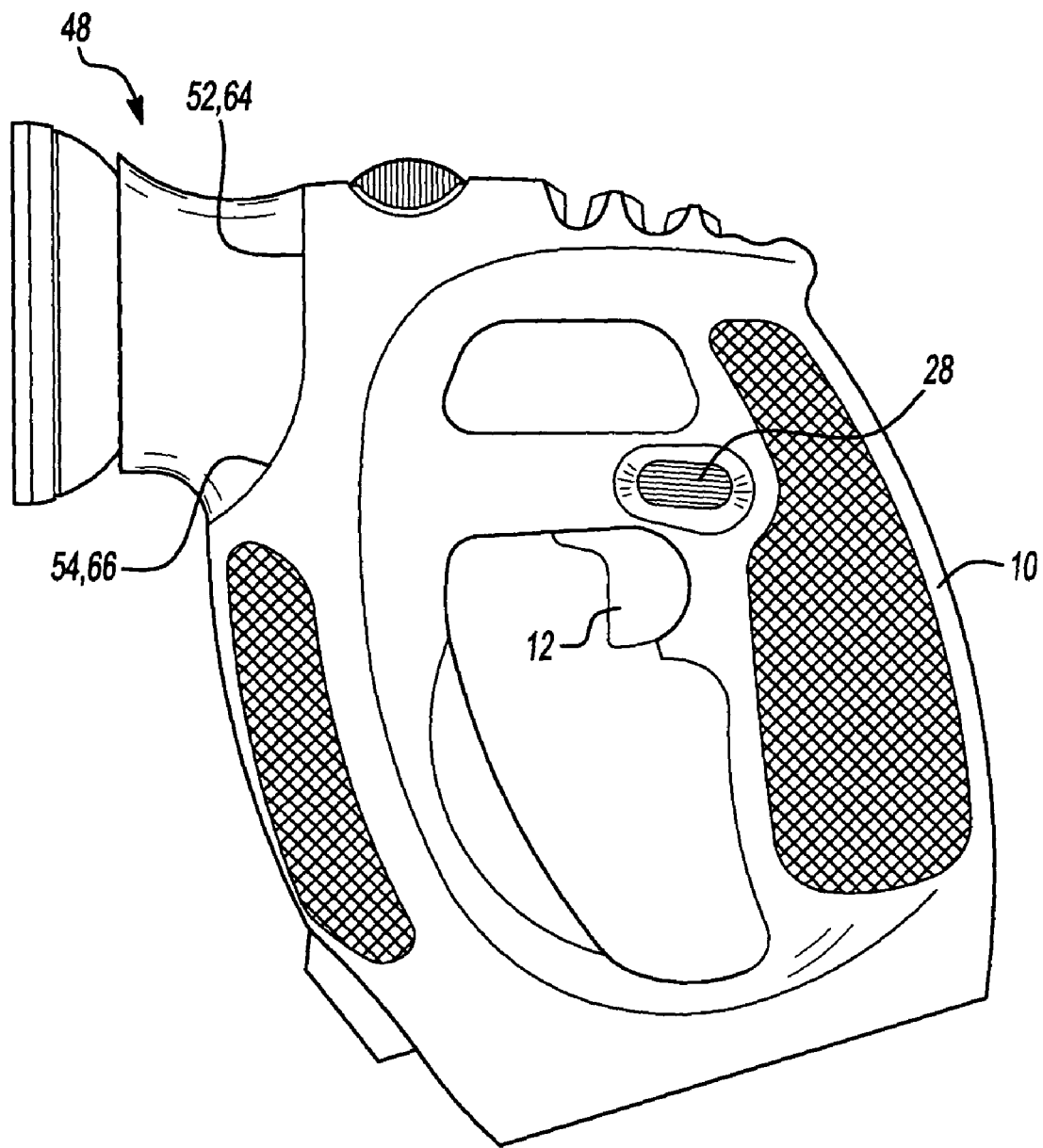
FIG. 8 shows a side view of the body portion of FIG. 1 with an attached sander head.

As can be seen from FIGS. 4, 5 and 6, each of the respective toolheads (44, 46, 48) each have a corresponding interface surface (62) again comprising a linear section (64) and a second cylindrical section (66) so that said interface surface (62) of each of the toolheads will co-operate exactly with the substantially identical interface surface (50) of the tool body, as shown in FIGS. 3, 7 and 8.

In addition, each of the toolheads as seen in FIGS. 4, 5 and 6 have a uniform connection system (102). This toolhead connection system (102) comprises a rearwardly extending cylindrical spigot (104) which is shaped so as to fit snugly within a corresponding cylindrical opening (106) of the body portion (4). As can be seen from FIG. 1, the cylindrical opening (106) of the body portion is defined by a series of inwardly directed ribs (107) forming a substantially cylindrical chamber. The cylindrical spigot (104) has a substantially flat circular rear wall (108) disposed about a head axis (110). Projecting rearwardly of this wall (108) so as to extend coaxial with the axis (110) is a second, substantially cylindrical and hollow spigot (102) having a diameter substantially less than the diameter of the spigot (108). This hollow spigot (102) has a series of exterior cylindrical ribs (112) which define an outer cylindrical recess (114).

Thus as the toolhead is brought into engagement with the body portion (4) the connection system (102) is inserted into the cylindrical opening (22) of the body portion (4) so that a toolhead axis (110) extends substantially co-axial with the axis of the output spindle (20). As the connection system (102) passes into the cylindrical opening (22) it will cause the hollow cylindrical spigot to pass through the aperture (18) so as to encompass the splined member (22), to effect engagement with a cooperating member (not shown) in the toolhead so as to operate said toolhead.

When the toolhead has been fully connected to the tool body (4) the interface surface (50) of the tool body (4) and the interface surface (62) of the toolhead will abut in co-operating engagement as seen in FIG. 3, 7 or 8, whereby the cylindrical spigot (108) is received in co-operating engagement with the cylindrical inner surface (106) of the body portion (4).

To restrain each toolhead in connection with the body portion (4), the body portion (4) is further provided with a resiliently biased locking mechanism. This locking mechanism comprises two resiliently biased spring wires (not shown) and disposed symmetrically about the axis of the splined member. As the spigot (102) passes into the aperture (18) of the body portion (4) the spigot (102) will engage the biased wires and deflect them out of the path of the cylindrical spigot (102) whereby continued insertion will them enable these resiliently deflected wires to encounter the cylindrical recess (114) of the spigot (102) and, by returning to the resiliently biased position, snap engage with this recess (114) to restrain the connection system (102) from further axial displacement. This locking mechanism is further provided with a conventional pushbutton whereby actuation of such a pushbutton will cause the two wires to be pushed apart in a conventional manner so as to move them out of engagement with the cylindrical recess (114) in the connection system (102) to thereby release the toolhead when required.

It will be further appreciated that each of the toolheads (44,46,48) further comprises a projection indicated generally as 130 extending from the cylindrical section (66) of each toolhead which is to be received in a co-operating recess (132) in the second cylindrical section (54) of the interface surface (50) of the tool body (4). Amongst other uses, this projection (130) serves to orientate the toolhead for connection with the tool body and helps restrain the toolhead from rotation about the axis when connected to the tool body. In use, the design of the interface surface (50/62) between the tool body (4) and the respective toolheads (44,46,48) allows for optimum performance of the tool irrespective of the particular function defined by the toolhead. Referring firstly to FIG. 3 when the drill/driver head has been attached to the tool body it will be understood by those skilled in the art that the majority of the static load transmitted through the interface (50/62) will be co-axial with respect to the motor and spindle (20) axis as is conventional for operation of a standard drill. In this situation the linear section (52) of the interface surface absorbs the majority of the load. Furthermore, the reaction torque generated by drilling and/or screwdriving is resisted by the co-operating second cylindrical sections (54/66) section of the interface since it will be appreciated that in the drilling mode a rotational torque will be applied from the output spindle of the tool to the toolhead which exerts a natural tendency to rotate such toolhead. However, the curved "cup and cone" effect of the curved section of the interface when the toolhead is locked in engagement with the tool body will resist such rotational force.

Referring now to FIG. 8, when the sander head (48) has been attached to the tool body in the manner discussed above, the loads applied through the tool body to the toolhead are generally lower than for drilling but are still predominantly co-axial with the linear interface absorbing the majority of the load transmitted through the joint. However, again the second cylindrical section (54) of the interface serves to resist any rotation of the toolhead resulting from the rotational torque generated by the output spindle.

However, when the jig saw head (46) is attached to the tool body (4) (FIG. 7) the forces exerted between the interface (50/62) are quite different in that as well as applying a downward force to keep the soleplate in accurate contact with the workpiece, the operator also has to apply an "urging" torque from the handle via the interface to make the saw blade move forwards through the workpiece in a conventional manner. In this situation the second cylindrical section (54) of the interface resists this urging torque to good effect, restraining the toolhead from any potential shearing effect along the interface which could result in undue stress being applied to the output spindle of the motor which could damage the tool. In addition, the increased interface pressure required to maintain the jig saw toolhead in connection with the workpiece (i.e. pushing the tool body downwardly into engagement with the workpiece) provides an additional benefit that any turning action imposed on the handle (as is conventional in the use of a jig saw to cut a curve surface) will be effectively transferred through the cylindrical section interface (54) to the cutting blade, this applied torque by the user being transmitted directly to the toolhead via this curved interface.

Finally, it will be appreciated that the asymmetrical nature of the interface of the tool body and the respective toolheads will assist the user in correctly aligning the various toolheads prior to the connection of the toolheads to the body.

The invention claimed is:
1. A power tool comprising:
   a tool head having a connection structure and an input member that extends through the connection structure;
   a tool body having a housing and a motor, the motor being housed in the housing and including an output member, the housing defining an opening that is configured to receive the connection structure, the tool head being inserted into the opening along an insertion axis to removably attach the tool head to the tool body and couple the input member to the output member;
   at least one guide rail intersecting the connection structure, each guide rail being generally parallel to the insertion axis when the tool head is attached to the tool body; and at least one guide slot coupled to the opening, each guide slot being generally parallel to the insertion axis when the tool head is attached to the tool body and configured to receive an associated guide rail to thereby resist relative rotation between the tool head and the tool body;

wherein the connection structure includes a projection that extends rearwardly from an end wall that is configured to abut the tool body, the projection being sized to engage the opening to thereby align the tool head to the tool body.

2. The power tool of claim 1, wherein the opening is generally cylindrically shaped.

3. The power tool of claim 1, wherein the projection is generally concentrically disposed about the insertion axis when the tool head is attached to the tool body.

4. A power tool comprising:

a tool head having a connection structure and an input member that extends through the connection structure;

a tool body having a housing and a motor, the motor being housed in the housing and including an output member, the housing defining an opening that is configured to receive the connection structure, the tool head being inserted into the opening along an insertion axis to removably attach the tool head to the tool body and couple the input member to the output member;

at least one guide rail intersecting the connection structure, each guide rail being generally parallel to the insertion axis when the tool head is attached to the tool body; and at least one guide slot coupled to the opening, each guide slot being generally parallel to the insertion axis when the tool head is attached to the tool body and configured to receive an associated guide rail to thereby resist relative rotation between the tool head and the tool body;

wherein the at least one guide rail is coupled to an outer circumference of the connection structure.

5. A power tool comprising:

a tool head having a connection structure and an input member that extends through the connection structure;

a tool body having a housing and a motor, the motor being housed in the housing and including an output member, the housing defining an opening that is configured to receive the connection structure, the tool head being inserted into the opening along an insertion axis to removably attach the tool head to the tool body and couple the input member to the output member;

at least one guide rail intersecting the connection structure, each guide rail being generally parallel to the insertion axis when the tool head is attached to the tool body; and at least one guide slot coupled to the opening, each guide slot being generally parallel to the insertion axis when the tool head is attached to the tool body and configured to receive an associated guide rail to thereby resist relative rotation between the tool head and the tool body;

wherein the at least one guide rail is generally rectangular in shape in a direction that is transverse to the insertion axis.

6. A power tool comprising:

a tool head having a connection structure and an input member that extends through the connection structure;

a tool body having a housing and a motor, the motor being housed in the housing and including an output member, the housing defining an opening that is configured to receive the connection structure, the tool head being inserted into the opening alone an insertion axis to removably attach the tool head to the tool body and couple the input member to the output member;

at least one guide rail intersecting the connection structure, each guide rail being generally parallel to the insertion axis when the tool head is attached to the tool body; and at least one guide slot coupled to the opening, each guide slot being generally parallel to the insertion axis when the tool head is attached to the tool body and configured to receive an associated guide rail to thereby resist relative rotation between the tool head and the tool body;

wherein the connection structure includes a reduced diameter portion that is axially adjacent to two portions that are relatively larger than the reduced diameter portion; and wherein the tool body includes a locking mechanism that engages at least a portion of a perimeter of the reduced diameter portion when the locking mechanism is in an engaged condition, the locking mechanism further engaging a face of at least one of the two axially adjacent portions, the locking mechanism cooperating with the at least one of the two axially adjacent portions to inhibit relative movement between the tool head and the tool body along the insertion axis.

7. A power tool comprising:

a plurality of tool heads, each of the tool heads having a connection structure and at least one guide rail, the connection structure having an insertion axis and including an alignment projection that extends from a first abutting face of the connection structure, the alignment projection being circumferentially disposed about the insertion axis, the at least one guide rail being coupled to an outer perimeter of the connection structure and being disposed generally parallel to the insertion axis; and a tool body having a housing, a motor and at least one guide slot, the motor being housed in the housing and including an output member, the housing defining an opening that is configured to receive the connection structure, the opening extending through a second abutting face, the at least one guide slot being formed in an inner perimeter of the opening;

wherein each of the tool heads is fixedly but releasably attachable to the tool body such that the first abutting face abuts the second abutting face, the alignment projection extends through the opening and is engaged to the housing, and each guide rail being received into an associated one of the guide slots wherein the connection structure includes a reduced diameter portion that is axially adjacent to two portions that are relatively larger than the reduced diameter portion; and wherein the tool body includes a locking mechanism that engages at least a portion of a perimeter of the reduced diameter portion when the locking mechanism is in an engaged condition, the locking mechanism further engaging a face of at least one of the two axially adjacent portions, the locking mechanism cooperating with the at least one of the two axially adjacent portions to inhibit relative movement between the tool head and the tool body along the insertion axis.

* * * * *